United States Patent
Reece et al.

(10) Patent No.: US 10,411,285 B2
(45) Date of Patent: **\*Sep. 10, 2019**

(54) FLOW BATTERY BALANCING CELLS HAVING A BIPOLAR MEMBRANE FOR SIMULTANEOUS MODIFICATION OF A NEGATIVE ELECTROLYTE SOLUTION AND A POSITIVE ELECTROLYTE SOLUTION

(71) Applicant: Lockheed Martin Energy, LLC, Bethesda, MD (US)

(72) Inventors: Steven Y. Reece, Cambridge, MA (US); John Goeltz, Carmel, CA (US); Joseph Johannes Henricus Pijpers, Cambridge, MA (US); Paravastu Badrinarayanan, Cypress, TX (US)

(73) Assignee: Lockheed Martin Energy, LLC, Bethesda, MD (US)

( \* ) Notice: Subject to any disclaimer, the term of this patent is extended or adjusted under 35 U.S.C. 154(b) by 539 days.

This patent is subject to a terminal disclaimer.

(21) Appl. No.: 15/098,273

(22) Filed: Apr. 13, 2016

(65) Prior Publication Data
US 2016/0308234 A1    Oct. 20, 2016

Related U.S. Application Data

(60) Provisional application No. 62/147,034, filed on Apr. 14, 2015, provisional application No. 62/206,933, filed on Aug. 19, 2015.

(51) Int. Cl.
*H01M 8/18* (2006.01)
*H01M 8/0202* (2016.01)
(Continued)

(52) U.S. Cl.
CPC ......... *H01M 8/188* (2013.01); *H01M 8/0202* (2013.01); *H01M 8/04186* (2013.01);
(Continued)

(58) Field of Classification Search
None
See application file for complete search history.

(56) References Cited

U.S. PATENT DOCUMENTS 4,159,366 A    6/1979    Thaller
4,539,086 A    9/1985    Fujita et al.
(Continued)

FOREIGN PATENT DOCUMENTS

JP    H0628167 B2    4/1994
JP    H 08-21415 B2    3/1996
(Continued)

OTHER PUBLICATIONS

International Search Report and Written Opinion from PCT/US2017/028191, dated Jul. 19, 2017, 12 pages.
(Continued)

*Primary Examiner* — Rena Dye Cronin
(74) *Attorney, Agent, or Firm* — BakerHostetler LLP (57) ABSTRACT

Parasitic reactions, such as production of hydrogen and oxidation by oxygen, can occur under the operating conditions of flow batteries and other electrochemical systems. Such parasitic reactions can undesirably impact operating performance by altering the pH and/or state of charge of one or both electrolyte solutions in a flow battery. Electrochemical balancing cells can allow rebalancing of electrolyte solutions to take place. Electrochemical balancing cells suitable for placement in fluid communication with both electrolyte solutions of a flow battery can include: a first chamber containing a first electrode, a second chamber containing a second electrode, a third chamber disposed between the first chamber and the second chamber, an ion-selective membrane forming a first interface between the
(Continued)

first chamber and the third chamber, and a bipolar membrane forming a second interface between the second chamber and the third chamber.

9 Claims, 5 Drawing Sheets

(51) Int. Cl.
*H01M 8/04186* (2016.01)
*H01M 8/04276* (2016.01)
*H01M 8/1039* (2016.01)
*H01M 8/20* (2006.01)
*H01M 8/1023* (2016.01)

(52) U.S. Cl.
CPC ......... *H01M 8/04276* (2013.01); *H01M 8/20* (2013.01); *H01M 8/1023* (2013.01); *H01M 8/1039* (2013.01); *Y02E 60/528* (2013.01)

(56) References Cited

U.S. PATENT DOCUMENTS

| | | | |
|---|---|---|---|
| 5,026,465 | A | 6/1991 | Katz et al. |
| 5,258,241 | A | 11/1993 | Ledjeff et al. |
| 5,766,787 | A | 6/1998 | Watanabe et al. |
| 6,156,451 | A | 12/2000 | Banerjee et al. |
| 6,497,973 | B1 | 12/2002 | Amendola |
| 6,509,119 | B1 | 1/2003 | Kobayashi et al. |
| 7,179,561 | B2 | 2/2007 | Niu et al. |
| 2005/0084739 | A1 | 4/2005 | Swider-Lyons et al. |
| 2008/0292964 | A1* | 11/2008 | Kazacos ............ B60L 11/1879 429/231.5 |
| 2011/0117411 | A1 | 5/2011 | Horne et al. |
| 2011/0244277 | A1 | 10/2011 | Gordon, II et al. |
| 2013/0011704 | A1 | 1/2013 | Horne et al. |
| 2013/0084482 | A1 | 4/2013 | Chang et al. |
| 2013/0316199 | A1 | 11/2013 | Keshavarz et al. |
| 2014/0004402 | A1 | 1/2014 | Yan et al. |
| 2014/0057141 | A1* | 2/2014 | Mosso .................... H01M 8/20 429/51 |
| 2015/0017494 | A1 | 1/2015 | Amstutz et al. |
| 2015/0086896 | A1* | 3/2015 | Chang ................. H01M 8/0482 429/451 |
| 2016/0233531 | A1 | 8/2016 | Reece et al. |
| 2016/0248109 | A1 | 8/2016 | Esswein et al. |
| 2016/0308235 | A1 | 10/2016 | Reece |

FOREIGN PATENT DOCUMENTS

| | | |
|---|---|---|
| JP | 2000-502832 A | 3/2000 |
| JP | 2007-073428 A | 3/2007 |
| JP | 2010-539919 A | 12/2010 |
| WO | WO-97/24774 A1 | 7/1997 |
| WO | WO-02/15317 A1 | 2/2002 |
| WO | WO-2010/138942 A2 | 12/2010 |
| WO | WO-2013/090680 A2 | 6/2013 |
| WO | WO-2014/120876 A1 | 8/2014 |
| WO | WO-2014/142963 A1 | 9/2014 |
| WO | 2015/048074 A1 | 4/2015 |
| WO | WO-2015/173359 A1 | 11/2015 |
| WO | WO-2016/168360 A1 | 10/2016 |

OTHER PUBLICATIONS

International Search Report and Written Opinion from PCT/US2017/030451, dated Jul. 5, 2017, 13 pages.
Soloveichik, "Flow Batteries: Current Status and Trends," 2015, Chem. Rev., 115 (20), pp. 11533-11558.
Partial Supplementary European Search Report dated Feb. 9, 2017, which isued in European Application No. 14847451.3.
Extended European Search Report from European Application No. 14857001.3, dated Apr. 26, 2017.
Xu, T.,"Development of bipolar membrane-based processes"; Desalination; Elsevier; vol. 140, No. 3, 2001, XP004329758; 247-258.
Reeve, R.W., A Sodium Borohydride-Hydrogen Peroxide Fuel Cell Employing a Bipolar Membrane Electrolyte; ECS Transactions, 42 (1); Jan. 2012; XP055520657; 117-129.
Annemiek Ter Heijne; A Bipolar Membrane Combined with Ferric Iron Reduction as an Efficient Cathode System in Microbial Fuel Cells; Environ. Sci Technol, 2006, 40; XP007904193; 5200-5205.

* cited by examiner

FLOW BATTERY BALANCING CELLS HAVING A BIPOLAR MEMBRANE FOR SIMULTANEOUS MODIFICATION OF A NEGATIVE ELECTROLYTE SOLUTION AND A POSITIVE ELECTROLYTE SOLUTION

CROSS-REFERENCE TO RELATED APPLICATIONS

The present application claims the benefit of priority under 35 U.S.C. § 119 from U.S. Provisional Patent Applications 62/206,933, filed on Aug. 19, 2015, and 62/147,034, filed on Apr. 14, 2015, each of which is incorporated herein by reference in its entirety.

STATEMENT REGARDING FEDERALLY SPONSORED RESEARCH OR DEVELOPMENT

Not applicable.

FIELD

The present disclosure generally relates to energy storage and, more specifically, to electrochemical balancing cells for flow batteries and methods for their use.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof will synonymously refer to a material that undergoes a change in oxidation state during operation of a flow battery or like electrochemical energy storage system (i.e., during charging or discharging).

Although flow batteries hold significant promise for large-scale energy storage applications, they have often been plagued sub-optimal energy storage performance (e.g., round trip energy efficiency) and limited cycle life, among other factors. Despite significant investigational efforts, no commercially viable flow battery technologies have yet been developed. Certain issues leading to poor energy storage performance, limited cycle life, and other performance-degrading factors are discussed hereinafter.

Balanced oxidation and reduction of the active materials within each half-cell of a flow battery are desirable electrochemical reactions, since these reactions contribute to the flow battery's proper operation during charging and discharging cycles. Such reactions may be referred to herein as "productive reactions." Undesirable parasitic reactions can also occur within one or both half-cells of flow batteries and related electrochemical systems. As used herein, the term "parasitic reaction" will refer to any side electrochemical reaction that takes place in conjunction with productive reactions.

Parasitic reactions can involve a component of an electrolyte solution that is not the active material. Electrochemical reactions of an active material that render the active material unable to undergo reversible oxidation and reduction can also be considered parasitic in nature. Parasitic reactions that commonly occur in aqueous electrolyte solutions are evolution of hydrogen and/or oxidation by oxygen. Hydrogen evolution, for example, can at least partially discharge the negative electrolyte of an electrochemical system while leaving the positive electrolyte unchanged. Even more significantly, parasitic reactions can change the pH of an electrolyte solution, which can destabilize the active material in some instances. Hydrogen evolution, for example, can raise the pH of an electrolyte solution by consuming protons. In non-aqueous electrolyte solutions, the electrolyte solvent can be similarly oxidized or reduced in an undesired parasitic reaction process. Further, in both aqueous and non-aqueous electrolyte solutions, electrode materials and other cell components can also undergo parasitic reactions (e.g., carbon or metal corrosion, separator oxidation, or the like) in some cases.

Discharge arising from parasitic reactions can decrease the operating efficiency and other performance parameters of flow batteries. In the case of a parasitic reaction that occurs preferentially in one half-cell over the other, an imbalance in state of charge can result between the negative and positive electrolyte solutions. The term "state of charge" (SOC) is a well understood electrochemical energy storage term that will refer herein to the relative amounts of reduced and oxidized species at an electrode within a given half-cell of an electrochemical system. Charge imbalance between the electrolyte solutions of a flow battery can lead to mass transport limitations at one of the electrodes, thereby lowering the round-trip operating efficiency. Since the charge imbalance can grow with each completed charge and discharge cycle, increasingly diminished performance of a flow battery can result due to parasitic reactions.

Charge rebalancing of one or both electrolyte solutions can be conducted to combat the effects of parasitic reactions. Various charge rebalancing strategies are available for electrolyte solutions, although they can be difficult to perform, costly, and time-consuming. For example, determining the true concentrations of oxidized and reduced species for the active material in an electrolyte solution can oftentimes itself be a difficult task, thereby further complicating the charge rebalancing process. Nevertheless, charge rebalancing can often be performed given sufficient diligence.

In contrast, the pH changes accompanying parasitic reactions can be significantly more difficult to address. Small changes in proton and hydroxide ion concentrations can produce dramatic swings in pH, which can be problematic for some active materials. Without adequate ways to address pH fluctuations, the working lifetimes of electrolyte solutions can be significantly compromised. Adjustment of pH through adding an extraneous acid or base to an electrolyte solution can be undesirable due to the accompanying changes in ionic strength and concentration of the active material. Further, addition of an extraneous acid or base at a rate sufficient to maintain a desired pH window in an electrolyte solution can sometimes be difficult, since the rates of parasitic reactions can often be highly variable. Since the pH changes resulting from parasitic reactions within electrolyte solutions can be additive, buffers may provide only temporary protection against pH changes until the buffering capacity has been exceeded.

In view of the foregoing, alternative rebalancing strategies for flow batteries and related electrochemical systems would be highly desirable in the art. The present disclosure satisfies the foregoing needs and provides related advantages as well.

SUMMARY

In some embodiments, the present disclosure provides flow battery systems containing a first half-cell containing a first electrolyte solution, and a second half-cell containing a second electrolyte solution, where both the first half-cell and the second half-cell are in fluid communication with an electrochemical balancing cell. The electrochemical balancing cell includes a first chamber containing a first electrode, a second chamber containing a second electrode, a third chamber disposed between the first chamber and the second chamber, an ion-selective electrode forming a first interface between the first chamber and the third chamber, and a bipolar membrane forming a second interface between the second chamber and the third chamber. At least one of the first electrolyte solution and the second electrolyte solution constitute an aqueous electrolyte solution.

In other various embodiments, the present disclosure provides methods including: providing an electrochemical balancing cell including a first chamber containing a first electrode, a second chamber containing a second electrode, a third chamber disposed between the first chamber and the second chamber, an ion-selective electrode forming a first interface between the first chamber and the third chamber, and a bipolar membrane forming a second interface between the second chamber and the third chamber; introducing a first electrolyte solution containing a first active material into the third chamber; introducing a second electrolyte solution containing a second active material into the first chamber and the second chamber; applying a potential across the electrochemical balancing cell so as to induce a current therein, such that the second electrode is a positive electrode and the first electrode is a negative electrode; and converting water into protons and hydroxide ions at the bipolar membrane. The protons migrate into the first electrolyte solution in the third chamber and the hydroxide ions migrate into the second electrolyte solution in the second chamber. At least one of the first electrolyte solution and the second electrolyte solution constitutes an aqueous electrolyte solution. In further embodiments, the methods include transferring the first electrolyte solution and the second electrolyte solution between the electrochemical balancing cell and a flow battery.

In still other various embodiments, the present disclosure provides methods including: providing an electrochemical balancing cell including a first chamber containing a first electrode, a second chamber containing a second electrode, a third chamber disposed between the first chamber and the second chamber, an ion-selective electrode forming a first interface between the first chamber and the third chamber, and a bipolar membrane forming a second interface between the second chamber and the third chamber; introducing a first electrolyte solution containing a first active material into the third chamber; introducing a second electrolyte solution containing a second active material into the first chamber and the second chamber; providing hydrogen peroxide to the second chamber; applying a potential across the electrochemical balancing cell so as to induce a current therein, such that the second electrode is a positive electrode and the first electrode is a negative electrode; converting the hydrogen peroxide into protons and oxygen in the second chamber; and converting water into protons and hydroxide ions at the bipolar membrane. The protons formed at the bipolar membrane migrate into the first electrolyte solution in the third chamber and the hydroxide ions formed at the bipolar membrane migrate into the second electrolyte solution in the second chamber. At least one of the first electrolyte solution and the second electrolyte solution constitutes an aqueous electrolyte solution. In further embodiments, the methods include transferring the first electrolyte solution and the second electrolyte solution between the electrochemical balancing cell and a flow battery.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to electrochemical balancing cells that can adjust pH in two electrolyte solutions simultaneously. The present disclosure is also directed, in part, to flow batteries in fluid communication with an electrochemical balancing cell that can adjust pH in two electrolyte solutions simultaneously. The present disclosure is also directed, in part, to methods for adjusting pH in two electrolyte solutions simultaneously using an electrochemical balancing cell.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about" Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. Parasitic reactions are one factor that can compromise the operating efficiency of flow batteries. Types of parasitic reactions that can occur in flow batteries include, for example, generation of hydrogen and oxidation by oxygen. Hydrogen generation can be especially problematic due to the pH change that accompanies it. Parasitic reactions can further result in partial discharge of one or both electrolyte solutions, potentially creating a state of charge imbalance. Although charge imbalance can be a nuisance, it can often be addressed given sufficient diligence. Issues directly or indirectly associated with pH changes in an electrolyte solution can be much more difficult to resolve, however.

One way in which the performance of flow batteries can be improved is through incorporation of a coordination complex as an active material in one or both electrolyte solutions. As used herein, the terms "coordination complex," "coordination compound," and "metal-ligand compound" will refer to any compound having a metal bound to one or more ligands through a covalent bond. Although coordination complexes can improve the operating performance of flow batteries, they can be especially susceptible toward pH changes, as discussed hereinafter.

Although parasitic reactions can be undesirable for all types of flow batteries, the pH changes accompanying hydrogen evolution can be especially problematic for electrolyte solutions containing coordination complexes. Oftentimes, such substances can be stable only within a narrow pH window, and generation of even small amounts of protons or hydroxide ions within the electrolyte solution can result in wild pH swings that can comprise the operability of a flow battery. Further, pH regulation of electrolyte solutions can be problematic to manage due to changes in ionic strength and/or decreased concentration of the active material. Although buffers can be utilized in some instances to forestall pH changes, they cannot be used in all cases, and it may not be possible to provide sufficient buffering capacity to maintain an electrolyte solution in a usable condition over its anticipated working lifetime.

In addition to parasitic reactions, crossover of active materials from one half-cell of a flow battery to the other can result in undesirable discharge and accompanying pH changes in the receiving electrolyte solution in some instances. Depending on the nature of the active materials, either an increased or decreased pH can result in an electrolyte solution receiving an electrolyte solution during crossover. Discharge and pH changes accompanying crossover of active materials can accompany those associated with parasitic reactions and can be addressed similarly.

Although unwanted discharge of an electrolyte solution can be a nuisance to deal with, there are often feasible ways to bring one or both electrolyte solutions back up to a desired state of charge. Specifically, one or both electrolyte solutions can be introduced to a balancing cell and undergo oxidation or reduction as needed to restore a balanced state of charge. For example, rebalancing can take place in a two-chamber balancing cell in which an active material is oxidized or reduced in one chamber, and ions liberated from the active material migrate to the opposite chamber through an ion-selective membrane to maintain charge balance. This approach, however, does not have an impact on the pH of the electrolyte solution. Further, separate balancing cells may be needed for rebalancing each electrolyte solution.

Given the general issues associated with pH control in electrolyte solutions, the present inventors discovered a pH modification strategy that can take place without addition of an extraneous acid or base to the electrolyte solution. Namely, the inventors discovered that by utilizing a three-chamber electrochemical balancing cell and splitting water molecules in situ within a bipolar membrane of the balancing cell, the pH of an electrolyte solution within the balancing cell can be adjusted as needed. More specifically, both electrolyte solutions from a flow battery can be processed through the electrochemical balancing cell at the same time to adjust the pH of both electrolyte solutions simultaneously. Depending upon how the electrolyte solutions are processed through the electrochemical balancing cell, the pH can be either raised or lowered as desired. By processing both electrolyte solutions simultaneously, the pH of one electrolyte solution can be lowered while the pH of the other electrolyte solution is increased, or vice versa. In a modification utilizing hydrogen peroxide in conjunction with the electrochemical balancing cell, the pH of one electrolyte solution can be raised or lowered, while the pH of the other electrolyte solution remains the same or substantially the same. The cell architecture and further details directed to its operation will be discussed in more detail hereinbelow. Advantageously, the three-chamber electrochemical balancing cells of the present disclosure can be coupled to other balancing cells in which charge rebalancing of the electrolyte solutions can further take place.

Figure 1:
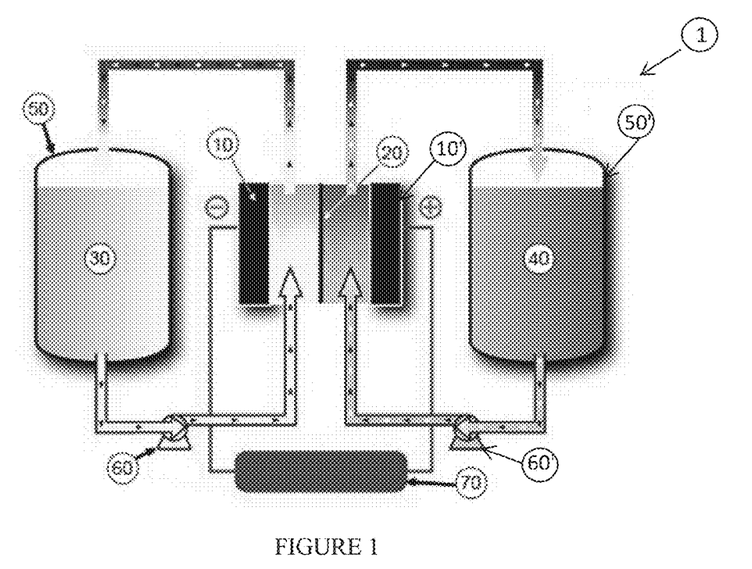
FIG. 1 shows a schematic of an illustrative flow battery containing a single electrochemical cell.

Before further discussing the balancing strategies discovered by the present inventors, illustrative flow battery configurations and their operating characteristics will first be described in greater detail hereinafter. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

As shown in FIG. 1, flow battery system 1 includes an electrochemical cell that features separator 20 between the two electrodes 10 and 10' of the electrochemical cell. As used herein, the terms "separator" and "membrane" will refer to an ionically conductive and electrically insulating material disposed between the positive and negative electrodes of an electrochemical cell. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be disposed in contact with separator 20 in more particular embodiments, or a porous material can intervene between the two.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps can also be used to affect transport of active materials 30 and 40 from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

The illustrative flow batteries described hereinabove can be placed in fluid communication with an electrochemical balancing cell of the present disclosure to provide a flow battery system. In various embodiments, electrochemical balancing cells of the present disclosure can include a first chamber containing a first electrode, a second chamber containing a second electrode, a third chamber disposed between the first chamber and the second chamber, an ion-selective membrane forming a first interface between the first chamber and the third chamber, and a bipolar membrane forming a second interface between the second chamber and a third chamber.

In some embodiments, the first electrode can be a negative electrode and the second electrode can be a positive electrode. In other embodiments, the first electrode can be a positive electrode and the second electrode can be a negative electrode. As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode.

As used herein, the term "bipolar membrane" will refer to a non-porous ion-exchange membrane having two oppositely charged ion-exchange layers overlaying and contacting one another. In more particular embodiments, the bipolar membrane can include a first ion-exchange material that is substantially permeable toward anions and a second ion-exchange material that is substantially permeable toward cations. The first ion-exchange material, in turn, is substantially impermeable toward cations and the second ion-exchange material is substantially impermeable toward anions. More particularly, a bipolar membrane can include an anion-exchange material and a cation-exchange material that are disposed in a layered structure.

Figure 2:
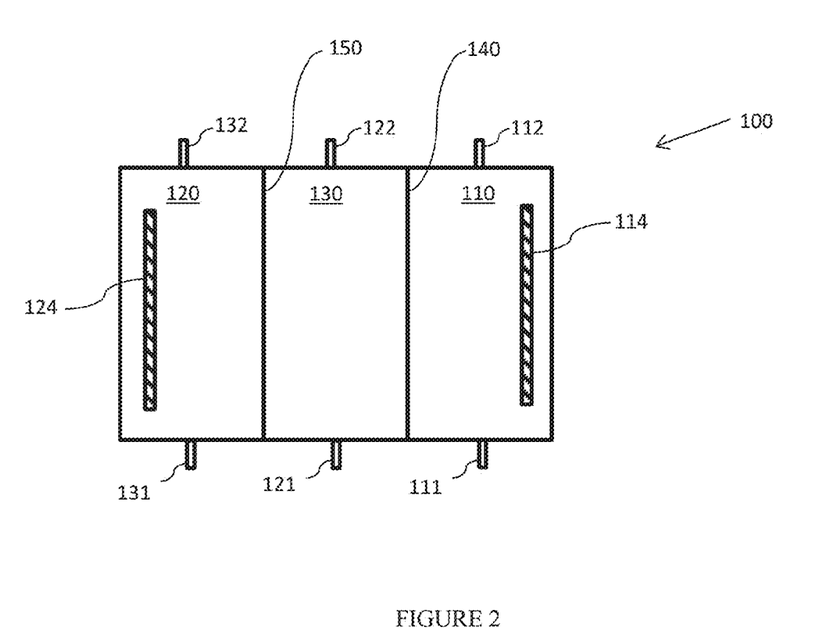
FIG. 2 shows a diagram of an illustrative electrochemical balancing cell of the present disclosure.

FIG. 2 shows a diagram of an illustrative electrochemical balancing cell of the present disclosure. As shown in FIG. 2, electrochemical balancing cell 100 contains first chamber 110, second chamber 120, and third chamber 130. Third chamber 130 is disposed between first chamber 110 and second chamber 120. First, second and third chambers 110, 120 and 130 have corresponding inlets 111, 121 and 131 and outlets 112, 122 and 132 depending therefrom, which allow first and second electrolyte solutions to be introduced to and withdrawn from electrochemical balancing cell 100. Further disclosure to this effect follows below. First chamber 110 contains first electrode 114, and second chamber 120 contains second electrode 124. In some embodiments, first electrode 114 can be a negative electrode and second electrode 124 can be a positive electrode. In other embodiments, first electrode 114 can be a positive electrode and second electrode 124 can be a negative electrode. Electrodes 114 and 124 allow a potential to be applied across electrochemical balancing cell 100 in order to address pH changes within the first and second electrolyte solutions. The first electrolyte solution can be present in the first chamber and second chamber, or in only the third chamber according to the disclosure herein. Any of the first, second and third chambers not occupied by the first electrolyte solution are occupied with the second electrolyte solution according to the disclosure herein. According to the present embodiments, at least one of the first electrolyte solution and the second electrolyte solution within the electrochemical balancing cell is an aqueous electrolyte solution, such as that received from a flow battery.

With continued reference to FIG. 2, electrochemical balancing cell 100 includes ion-selective membrane 140 between first chamber 110 and third chamber 130, and bipolar membrane 150 between second chamber 120 and third chamber 130. In various embodiments, ion-selective membrane 140 can include a cation-exchange material or an anion-exchange material. Considerations for choosing a particular type of ion-selective membrane are discussed hereinafter.

In embodiments in which ion-selective membrane 140 includes a cation-exchange material, ion-selective membrane 140 allows the passage of positively charged ions (i.e., cations) across the interface between first chamber 110 and third chamber 130 and substantially excludes the passage of negatively charged ions (i.e., anions). Migration of positively charged ions can occur in both directions across the cation-exchange material (i.e., from first chamber 110 to third chamber 130, or vice versa). When first electrode 114 is a negative electrode, the migration of positively charged ions is generally toward first chamber 110, and when first electrode 114 is a positive electrode the migration of positively charged ions is generally away from first chamber 110. Since active materials based upon coordination complexes often bear an overall negative charge, the use of a cation-exchange material as ion-selective membrane 140 can allow the active material to be substantially retained in its original electrolyte solution within first chamber 110 or third chamber 130. Illustrative coordination complexes bearing an overall negative charge are discussed hereinbelow.

Suitable cation-exchange materials that can be included in ion-selective membrane 140 of electrochemical balancing cell 100 are not considered to be particularly limited. Suitable cation-exchange materials can frequently bear sulfonic acid groups due to their high degree of disassociation into sulfonate anions. In some embodiments, the cation-exchange material can include a sulfonated polymer, such as a sulfonated, perfluorinated polymer. NAFION (DuPont) is representative example of such a cation-exchange material.

In alternative embodiments in which ion-selective membrane 140 includes an anion-exchange material, ion-selective membrane 140 allows the passage of negatively charged ions across the interface between first chamber 110 and third chamber 130 and substantially excludes the passage of positive charged ions. Again, migration of the negatively charged ions can occur in both directions at ion-selective membrane 140. When first electrode 114 is a positive electrode, the migration of negatively charged ions is generally toward first chamber 110, and when first electrode 114 is a negative electrode the migration of negatively charged ions is generally away from first chamber 110. Selection of an anion-exchange material for inclusion within ion-selective membrane 140 can occur in the event that a coordination complex bearing an overall positive charge is used as an active material in an electrolyte solution located within first chamber 110 or third chamber 130. Otherwise, unwanted crossover of the active material across ion-selective membrane 140 can occur. Suitable anion-exchange materials for inclusion in ion-selective membrane 140 can include those bearing quaternary ammonium functional groups and phosphonium groups.

Similarly, bipolar membrane 150 allows charged coordination complexes of either type to be retained in second chamber 120 and/or third chamber 130. Because bipolar membranes include both a cation-exchange material and an anion-exchange material, they can exclude the passage of positively charged materials and negatively charged materials in both directions. Thus, bipolar membrane 150 can substantially exclude crossover of the active materials within electrochemical balancing cell 100, provided that the active material retains an overall positive or negative charge. Bipolar membrane 150 can, however, allow outward migration of a negatively charged substance and a positively charged substance from an interface between the cation-exchange material and the anion-exchange material, as discussed further herein. In more particular embodiments, bipolar membrane 150 can contain a layer containing a cation-exchange material and a layer containing an anion-exchange material. When second electrode 124 is a positive electrode, the layer containing the anion-exchange material can form an interface with second chamber 120 and the layer containing the cation-exchange material can form an interface with third chamber 130. When second electrode 124 is a negative electrode, the layer containing the cation-exchange material can form an interface with second chamber 120 and the layer containing the anion-exchange material can form an interface with third chamber 130.

Suitable cation-exchange materials and anion-exchange materials can be present in bipolar membrane 150 include the same types of materials that can be present in ion-selective membrane 140 and are not considered to be particularly limited. In some embodiments, the same cation-exchange material or anion-exchange material as present in ion-selective membrane 140 can be present in bipolar membrane 150. In other embodiments, an entirely different cation-exchange material or anion-exchange material can be present in bipolar membrane 150.

The electrochemical balancing cells described hereinabove can be placed in fluid communication with a flow battery to provide a flow battery system. More specifically, such flow battery systems can include a first half-cell containing a first electrolyte solution, and a second half-cell containing a second electrolyte solution, where both the first half-cell and the second half-cell are in fluid communication with the electrochemical balancing cell. In some embodiments, the first half-cell can be a negative half-cell and the second half-cell can be a positive half-cell, each of which is in fluid communication with the electrochemical balancing cell. In other embodiments, the first half-cell can be a positive half-cell and the second half-cell can be a negative half-cell, each of which is in fluid communication with the electrochemical balancing cell. Equivalently, the first electrolyte solution can be a positive electrolyte solution and the second electrolyte solution can be a negative electrolyte solution, or vice versa.

In more specific embodiments, the first electrolyte solution can be a negative electrolyte solution, and the second electrolyte solution can be a positive electrolyte solution. Accordingly, in some embodiments, the first half-cell can be in fluid communication with the first chamber and the second chamber, and the second half-cell can be in fluid communication with the third chamber. In other embodiments, the first half-cell can be in fluid communication with the third chamber, and the second half-cell can be in fluid communication with the first chamber and the second. That is, in various embodiments, the first electrolyte solution can be present either in the first and second chambers of the electrochemical balancing cell, or in the third chamber of the electrochemical balancing cell, and any chambers not occupied by the first electrolyte solution can be occupied by the second electrolyte solution. In various embodiments, the flow battery can be configured to circulate the first and second electrolyte solutions between the flow battery and the electrochemical balancing cell.

Figure 3A:
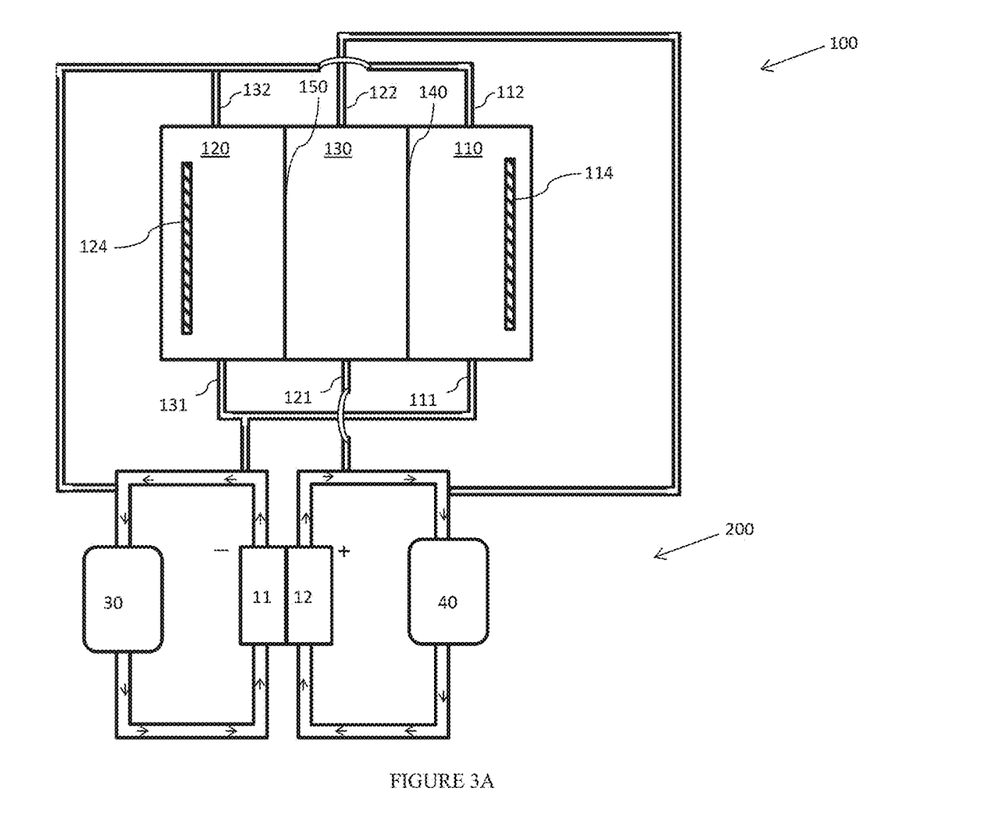
FIGS. 3A and 3B show diagrams of illustrative configurations in which both half-cells of an exemplary flow battery can be fluidly connected to the electrochemical balancing cell of FIG. 2.
Figure 3B:
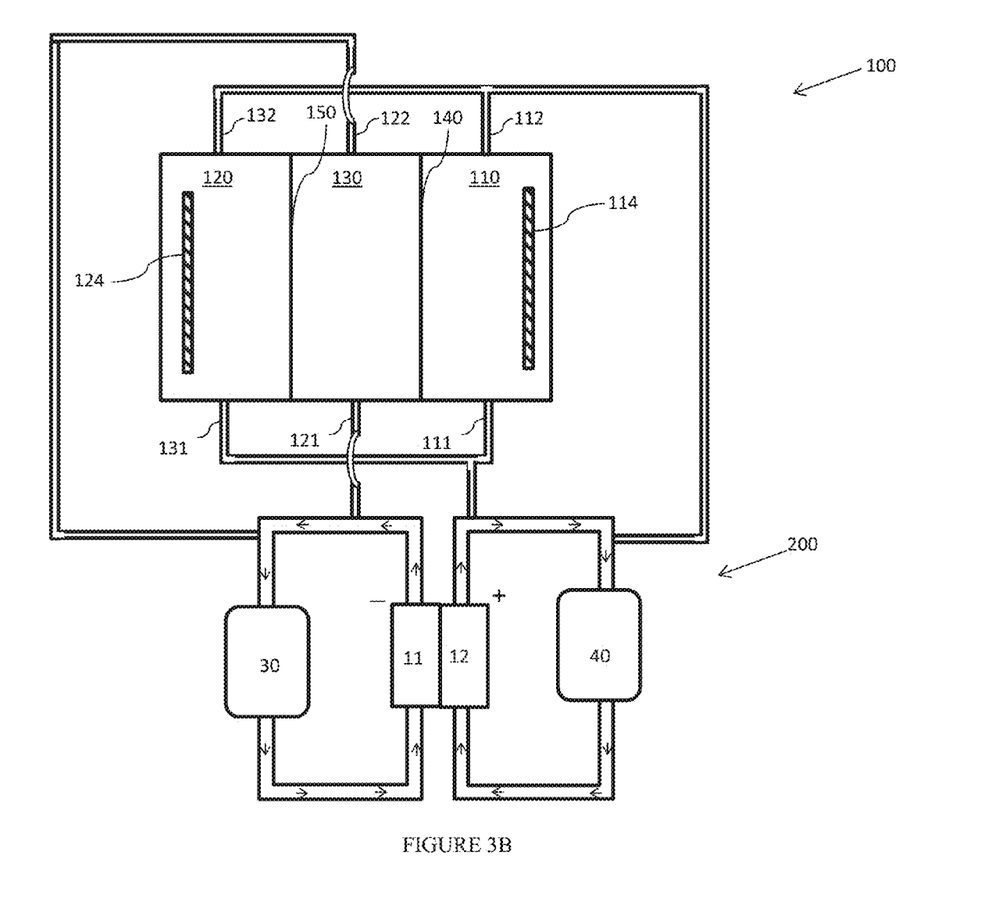

FIGS. 3A and 3B show diagrams of illustrative configurations in which both half-cells of an exemplary flow battery can be fluidly connected to the electrochemical balancing cell of FIG. 2. Flow battery 200 of FIGS. 3A and 3B is substantially similar in structure to that shown in FIG. 1, although certain details have been omitted and/or simplified in FIGS. 3A and 3B in the interest of clarity. Particular configurations are discussed in more detail hereinafter. Although FIGS. 3A and 3B have shown electrochemical balancing cell 100 as being connected to an outlet line leaving negative half-cell 11 and/or positive half-cell 12 of flow battery 200, it is to be recognized that such placement is illustrative in nature. For example, electrochemical balancing cell 100 can alternately be connected at tanks 30 or 40, or at an inlet line entering negative half-cell 11 and/or positive half-cell 12.

As shown in FIG. 3A, negative half-cell 11 of flow battery 200 can be placed in fluid communication with first chamber 110 and second chamber 120 of electrochemical balancing cell 100, and positive half-cell 12 of flow battery 200 can be placed in fluid communication with third chamber 130 of electrochemical balancing cell 100. As shown in FIG. 3B, positive half-cell 12 of flow battery 200 can be placed in fluid communication with first chamber 110 and second chamber 120 of electrochemical balancing cell 100, and negative half-cell 11 of flow battery 200 can be placed in fluid communication with third chamber 130 of electrochemical balancing cell 100. Considerations for establishing fluid communication to electrochemical balancing cell 100 in the foregoing manners are described in further detail hereinbelow in regard to discussion directed to adjusting pH or ionic strength of either electrolyte solution. In either configuration, operation of electrochemical balancing cell 100 by applying a potential across it can allow a pH increase to be affected in one of the electrolyte solutions while affecting a pH decrease in the other of the electrolyte solutions.

As indicated above, in the electrochemical balancing cell configurations described herein, at least one of the first electrolyte solution and the second electrolyte solution can constitute an aqueous electrolyte solution. When at least one of the first and second electrolyte solutions is an aqueous electrolyte solution, the electrolyte solution can provide water to the bipolar membrane for conversion into protons and hydroxide ions, as discussed hereinafter. In more particular embodiments, both the first electrolyte solution and the second electrolyte solution can constitute an aqueous electrolyte solution. Further description of suitable aqueous solutions follows hereinbelow. In alternative configurations, flow batteries having substantially non-aqueous electrolyte solutions in both of their half-cells can also be processed with the electrochemical balancing cells of the present disclosure.

In other more specific embodiments, at least one of the first electrolyte solution and the second electrolyte solution can contain a coordination complex as an active material. In some embodiments, both the first electrolyte solution and the second electrolyte solution can contain a coordination complex as an active material. Additional disclosure on illustrative coordination complexes follows hereinafter.

Due to their variable oxidation states, transition metals can be highly desirable for use as the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In more specific embodiments, the transition metal can be Ti. Other suitable transition and main group metals that can be present in the coordination compounds of the present disclosure include, for example, Ca, Ce, Co, Cu, Mg, Mn, Mo, Ni, Pd, Pt, Ru, Sr, Sn, V, Zn, Zr, and any combination thereof. In various embodiments, the coordination compounds can include a transition metal in a non-zero oxidation state when the transition metal is in both its oxidized and reduced forms. Cr, Fe, Mn, Ti and V can be particularly desirable in this regard.

In some embodiments, at least one of the active materials within a flow battery can include a coordination complex bearing at least one catecholate ligand or substituted catecholate ligand. Sulfonated catecholate ligands can be particularly desirable substituted catecholate ligands due to their ability to promote solubility of coordination complexes in which they are present. In some or other embodiments, at least one of the active materials within a flow battery can include an iron hexacyanide complex. Iron hexacyanide complexes can be particularly desirable for use as a first active material in combination with transition metal coordination complexes bearing a catecholate ligand or substituted catecholate ligand as a second active material.

In more specific embodiments, the coordination complex can have a formula of wherein M is a transition metal; D is ammonium, tetraalkylammonium ($C_1$-$C_4$ alkyl), or an alkali metal ion (e.g., $Li^+$, $Na^+$ or $K^+$); g ranges between 0 and 6; and $L_1$, $L_2$ and $L_3$ are ligands. In more specific embodiments, at least one of $L_1$, $L_2$ and $L_3$ can be a catecholate ligand or a substituted catecholate ligand. In other embodiments, each of $L_1$, $L_2$ and $L_3$ can be a catecholate ligand or substituted catecholate.

Other ligands that can be present in coordination complexes within a flow battery, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex within a flow battery include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

As indicated above, the various cell configurations of the present disclosure can benefit when at least one of the first electrolyte solution and the second electrolyte solution constitutes an aqueous electrolyte solution in which an active material is dissolved. As used herein, the term "aqueous" will refer to the condition of water being the predominant component of a mixture or solution. As used herein, the term "aqueous electrolyte solution" will refer to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in aqueous electrolyte solutions include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, including those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second aqueous electrolyte solutions. The chambers provide separate reservoirs within the flow battery, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second aqueous electrolyte solutions, (2) electrically insulating to reduce or prevent short circuits between the positive and negative electrodes, and (3) facilitating ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2—CF_2CF_2CF_2CF_2—O—CF=CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 $mA/cm^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign, or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporated within the present disclosure can have one or more of the following operating characteristics: (a) where, during the operation of the flow battery, the first or second active materials constitute less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than are available from a single electrochemical cell. In such cases, several battery cells can be connected in series such that the voltage of each cell is additive. This forms a bipolar stack, also referred to as an electrochemical stack. A bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this was, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack), storage tanks and piping for containing and transporting the electrolyte solutions; control hardware and software (which may include safety systems), and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Having now described electrochemical balancing cells and flow battery systems of the present disclosure, methods for adjusting pH of electrolyte solutions using the electrochemical balancing cells will now be presented in further detail. Depending on the particular configuration in which a flow battery is in fluid communication with the electrochemical balancing cell described hereinabove, the electrochemical balancing cell can be suitably increase the pH in one electrolyte solution while decreasing the pH in the other electrolyte solution. That is, the electrochemical balancing cells of the present disclosure can be suitably used to decrease the pH of the negative electrolyte solution of a flow battery while increasing the pH of the positive electrolyte solution, or vice versa. In some instances, the pH of one electrolyte solution can be adjusted while the pH of the other electrolyte solution remains largely the same by adding hydrogen peroxide to the electrochemical balancing cell, as discussed further below. Adjustment of the pH can include introducing the first and second electrolyte solutions to the electrochemical balancing cell and applying a potential thereto. The various cell configurations presented above are discussed in further detail hereinafter in regard to pH adjustment.

Accordingly, in some embodiments, methods of the present disclosure can include: providing the electrochemical balancing cell of the present disclosure, such as that shown in FIG. 2; introducing a first electrolyte solution containing a first active material into the third chamber; introducing a second electrolyte solution containing a second active material into the first chamber and the second chamber; applying a potential across the electrochemical balancing cell so as to induce a current therein, such that the second electrode is a positive electrode and the first electrode is a negative electrode; and converting water into protons and hydroxide ions at the bipolar membrane in the presence of the potential. At least one of the first electrolyte solution and the second electrolyte solution constitute an aqueous electrolyte solution. Under the applied potential, the protons migrate into the first electrolyte solution in the third chamber and the hydroxide ions migrate into the water or the aqueous solution in the second chamber. Such methods are further illustrated in more detail in FIGS. 4 and 5, which are discussed in greater detail hereinbelow.

In some embodiments, the first electrolyte solution and the second electrolyte solution can be balanced independently of their circulation through a flow battery. In more particular embodiments, however, the methods for balancing the first and second electrolyte solutions can include placing the electrochemical balancing cell in fluid communication with a first half-cell and a second half-cell of a flow battery, and transferring the first electrolyte solution and the second electrolyte solution between the electrochemical balancing cell and the flow battery. Transferring the first and second electrolyte solutions to the flow battery can take place continuously or discontinuously. Continuous transfer can involve circulating a portion of the first and second electrolyte solutions through the electrochemical balancing cell while the remaining portions of the first and second electrolyte solution are available to circulate through the flow battery. Upon circulating the first and second electrolyte solutions from the electrochemical balancing cell, the pH-balanced electrolyte solutions can again be circulated to the flow battery.

In some embodiments, the first electrolyte solution can be transferred to a negative half-cell of the flow battery, and the second electrolyte solution can be transferred to the positive half-cell of the flow battery. In other embodiments, the first electrolyte solution can be transferred to a positive half-cell of the flow battery, and the second electrolyte solution can be transferred to the negative half-cell of the flow battery. Accordingly, a negative electrolyte solution of the flow battery can be transferred either the first and second chambers of the electrochemical balancing cell, or the third chamber of the electrochemical balancing cell, and the positive electrolyte solution can be transferred to any of the chambers of the electrochemical balancing cell that are unoccupied by the negative electrolyte solution. Therefore, the pH of the negative electrolyte solution can be either increased or decreased, while the pH of the positive electrolyte solution is adjusted in the opposite direction. Whether the pH is increased or decreased in a given electrolyte solution can be dictated by the particular chambers of the electrochemical balancing cell to which the electrolyte solutions are introduced, as discussed hereinafter. Alternately, the pH of one of the electrolyte solutions can remain largely the same by adding hydrogen peroxide thereto, as discussed hereinafter.

In some embodiments, the first electrolyte solution or the second electrolyte solution can be further transferred to a balancing cell configured for adjusting the state of charge. Transfer to a balancing cell configured for adjusting state of charge can take place before or after pH adjustment in the electrochemical balancing cell described herein. Illustrative balancing cells that can be used for adjusting state of charge include, for example, those described in International Patent Application Publication 2015/048074, which is incorporated by reference herein in its entirety.

In some embodiments, the first electrolyte solution can be introduced to the third chamber of the electrochemical balancing cell, and the second electrolyte solution can be introduced to the first chamber and the second chamber. Such introduction is possible with the cell configurations of FIGS. 3A and 3B, in which FIG. 3A shows introduction of a positive electrolyte to the third chamber and FIG. 3B shows introduction of a negative electrolyte to the third chamber.

Figure 4:
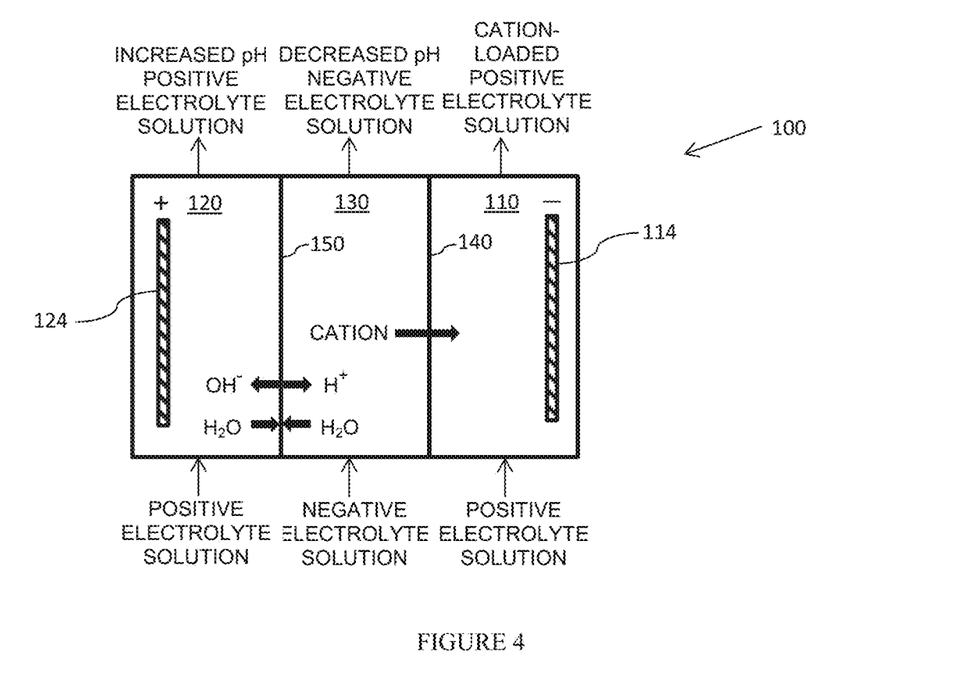
FIG. 4 shows a diagram of the electrochemical balancing cell of FIG. 2 upon introduction of a negative electrolyte solution to the third chamber of the cell and introduction of a positive electrolyte solution to the first and second chambers of the cell in the presence of an applied potential.

FIG. 4 shows a diagram of the electrochemical balancing cell of FIG. 2 upon introduction of a negative electrolyte solution to the third chamber of the cell and introduction of a positive electrolyte solution to the first and second chambers of the cell in the presence of an applied potential. In the interest of clarity, FIG. 4 omits the fluid communication of electrochemical balancing cell 100 to a flow battery and certain other details found in the earlier FIGURES so that the rebalancing reactions taking place in the presence of the applied potential can be better understood. As shown in FIG. 4, a negative electrolyte solution enters third chamber 130 and a positive electrolyte solution enters first and second chambers 110 and 120 as a potential is applied between first and second electrodes 114 and 124. As further shown in FIG. 4, the applied potential is such that first electrode 114 in first chamber 110 is a negative electrode and second electrode 124 in second chamber 120 is a positive electrode.

Since water from the aqueous electrolyte solution(s) is uncharged, it can enter bipolar membrane 150. Water can enter bipolar membrane 150 from either the positive electrolyte solution in second chamber 120 or the negative electrolyte solution in third chamber 130. In the presence of the applied potential, the water can undergo electrolysis in bipolar membrane 150 to form protons (i.e., hydronium ions) and hydroxide ions. The protons and hydroxide ions then migrate from bipolar membrane 150 as shown in FIG. 4. The negatively charged hydroxide ions migrate into the positive electrolyte solution in second chamber 120, since they are attracted to the positively charged second electrode 124. In turn, the positively charged protons migrate the opposite direction through bipolar membrane 150 into the negative electrolyte solution within third chamber 130. The directionality of the proton and hydroxide ion migration can further be aided by the disposition of the cation-exchange material and anion-exchange material in bipolar membrane 150. Specifically, the directionality shown in FIG. 4 can be promoted when a layer of anion-exchange material faces second chamber 120 and a layer of cation-exchange material faces third chamber 130.

Accordingly, as shown in FIG. 4, the pH of the positive electrolyte solution within second chamber 120 increases upon uptake of the hydroxide ions. Similarly, the pH of the negative electrolyte solution within third chamber 130 decreases upon uptake of protons. The decrease in pH within the negative electrolyte solution can be used to offset pH increases resulting from parasitic reactions, such as hydrogen generation, or other sources during operation of a flow battery. The applied potential can be sustained until a desired pH has been reached, for example. Upon exiting electrochemical balancing cell 100, the pH-adjusted electrolyte solutions can be recirculated to the appropriate half-cell of a flow battery, as described above.

In various embodiments, the potential applied to the balancing cell can range between about 0.1 V and about 2 V. Such voltages can be applicable for ion-selective membranes and bipolar membranes having thicknesses under about 4 mm and for electrolyte solutions having reasonable conductivity values, such as above about 10 mS/cm.

Referring still to FIG. 4, upon uptake of protons by the negative electrolyte solution in third chamber 130, a cation migrates across ion-selective membrane 140 aided by the cation's attraction to negatively charged first electrode 114. The migratable cations can include, for example, the positive counterions associated with a negatively charged active material (i.e., in a coordination complex) in the negative electrolyte solution and/or cations associated with an extraneous electrolyte present in the negative electrolyte solution. In illustrative embodiments, the migratable cations can be alkali metal ions or ammonium ions. Cation migration occurs to maintain charge neutrality in the negative electrolyte solution upon the introduction of protons thereto. Charge neutrality is similarly maintained in the positive electrolyte solution in first chamber 110 and second chamber 120, since for each hydroxide ion entering the positive electrolyte solution in second chamber 120, a corresponding cation enters the positive electrolyte solution in first chamber 110.

Figure 5:
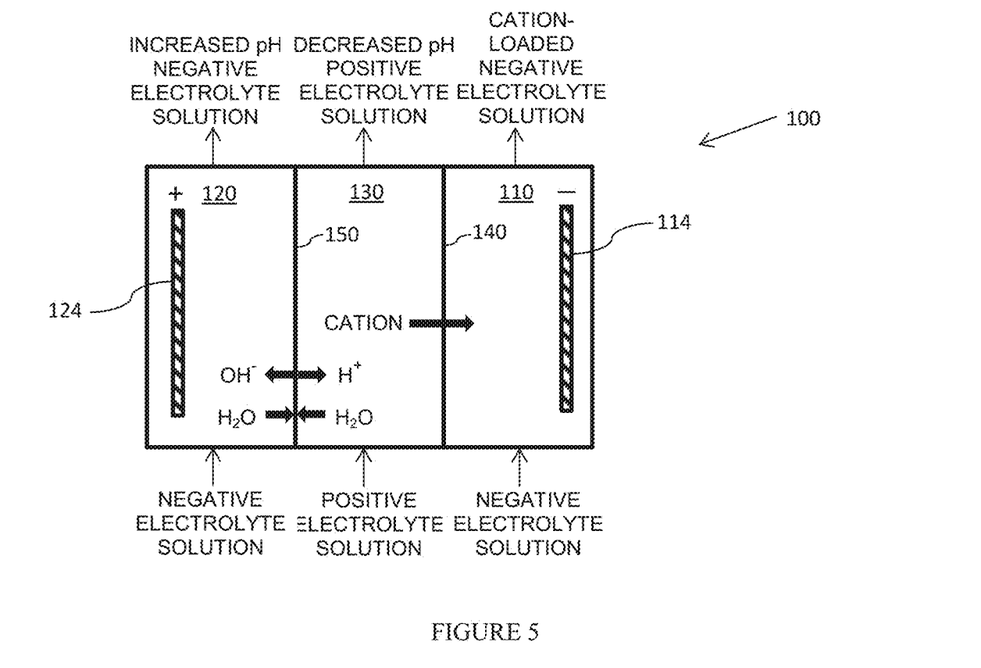
FIG. 5 shows a diagram of the electrochemical balancing cell of FIG. 2 upon introduction of a positive electrolyte solution to the third chamber of the cell and introduction of a negative electrolyte solution to the first and second chambers of the cell in the presence of an applied potential.

In other embodiments, a negative electrolyte solution from the flow battery can be introduced to the first chamber and the second chamber of the electrochemical balancing cell, and a positive electrolyte solution can be introduced to the third chamber. FIG. 5 shows a diagram of the electrochemical balancing cell of FIG. 2 upon introduction of a positive electrolyte solution to the third chamber of the cell and introduction of a negative electrolyte solution to the first and second chambers of the cell in the presence of an applied potential. FIG. 5 likewise omits the fluid communication details of electrochemical balancing cell 100 to a flow battery and certain other details found in earlier FIGURES so that the rebalancing reactions taking place in the presence of the applied potential can be better understood. Other than reversing the positions of the positive and negative electrolyte solutions in FIG. 5 and adjusting the pH values of these electrolyte solutions in the opposite directions, this FIGURE is identical to that shown in FIG. 4 and will not be described again in detail in the interest of brevity.

As discussed above, hydrogen generation is one type of parasitic reaction that can occur during operation of a flow battery. Specifically, a parasitic reaction to produce hydrogen can occur by Reaction 1 in the negative half-cell of a flow battery as shown below.

(Reaction 1)

Figure 6:
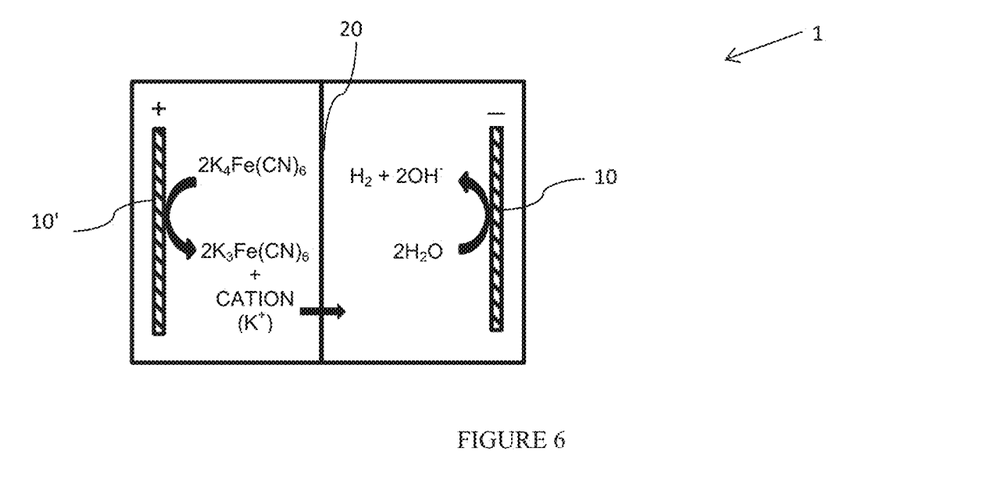
FIG. 6 shows a diagram of an illustrative flow battery demonstrating the reactions associated with parasitic generation of hydrogen.

Upon generation of hydrogen and hydroxide ions in the negative electrolyte solution, the pH can increase, as discussed above. A corresponding oxidation of the active material in the positive half-cell occurs in conjunction with the above parasitic reaction, along with cation migration to the negative electrolyte solution to offset the charge of the generated hydroxide ions. FIG. 6 shows a diagram of an illustrative flow battery demonstrating the reactions associated with parasitic generation of hydrogen. Although FIG. 6 has shown an iron hexacyanide complex as a specific active material undergoing oxidation in the positive half-cell, it is to be recognized that such disclosure is exemplary and non-limiting in order that the sequence of reactions can be better understood. As shown in FIG. 6, free cations from the oxidized iron hexacyanide complex in the positive half-cell of flow battery 1 migrate through separator 20 to counterbalance the increased charge associated with the hydroxide ions in the negative electrolyte solution. As discussed further below, the electrochemical balancing cells of the present disclosure can be used to remedy this type of cation imbalance without significantly impacting the pH of the one of the electrolyte solutions.

The inventors discovered that by adding hydrogen peroxide to one of the electrolyte solutions contacting the bipolar membrane in the electrochemical balancing cell, the pH change of this electrolyte solution can be suppressed. The hydrogen peroxide can be provided to the second chamber or the third chamber of the electrochemical balancing cell via an appropriate electrolyte solution, either continuously or discontinuously, to accomplish the foregoing.

More specifically, such methods can include: providing an electrochemical balancing cell including a first chamber containing a first electrode, a second chamber containing a second electrode, a third chamber disposed between the first chamber and the second chamber, an ion-selective electrode forming a first interface between the first chamber and the third chamber, and a bipolar membrane forming a second interface between the second chamber and the third chamber; introducing a first electrolyte solution containing a first active material into the third chamber; introducing a second electrolyte solution containing a second active material into the first chamber and the second chamber; providing hydrogen peroxide to the second chamber; applying a potential across the electrochemical balancing cell so as to induce a current therein, such that the second electrode is a positive electrode and the first electrode is a negative electrode; converting the hydrogen peroxide into protons and oxygen in the second chamber; and converting water into protons and hydroxide ions at the bipolar membrane. The protons formed a the bipolar membrane migrate into the first electrolyte solution in the third chamber and the hydroxide ions formed at the bipolar membrane migrate into the second electrolyte solution in the second chamber. At least one of the first electrolyte solution and the second electrolyte solution constitutes an aqueous electrolyte solution.

In further embodiments, such methods can include placing the electrochemical balancing cell in fluid communication with a first half-cell and a second half-cell of a flow battery, and transferring the first electrolyte solution and the second electrolyte solution between the electrochemical balancing cell and the flow battery. In some embodiments, the first electrolyte solution can be transferred to a positive half-cell of the flow battery, and the second electrolyte solution can be transferred to a negative half-cell of the flow battery. In other embodiments, the first electrolyte solution can be transferred to a negative half-cell of the flow battery, and the second electrolyte solution can be transferred to a positive half-cell of the flow battery. Accordingly, the hydrogen peroxide can be provided to either the first electrolyte solution or the second electrolyte solution according to the embodiments of the present disclosure and undergo conveyance to an appropriate chamber of the electrochemical balancing cell. The first and second electrolyte solutions can be negative and positive electrolyte solutions, or vice versa.

In some embodiments, the hydrogen peroxide can be added to the second chamber of the electrochemical balancing cell. In other embodiments, the hydrogen peroxide can be added to a portion of the second electrolyte solution before the second electrolyte solution enters the electrochemical balancing cell. More specifically, the hydrogen peroxide can be added to a portion of the second electrolyte solution after being transferred from a flow battery but before entering the second chamber of the electrochemical balancing cell.

The hydrogen peroxide can promote re-oxidation of the active material in the second electrolyte solution. Following introduction to the second electrolyte solution, the hydrogen peroxide can also undergo a reaction in the second chamber of the electrochemical balancing cell to produce oxygen and protons according to Reaction 2 below. This reaction can also occur in lieu of the oxidation of the active material in the presence of an applied potential if the hydrogen peroxide is already present in the electrolyte solution.

$$H_2O_2 \rightarrow O_2 + 2H^+ + 2e^-$$ (Reaction 2)

The generated protons can then become associated with the iron hexacyanide complex as shown in Reaction 3 below. Alternately, the generated protons can displace at least a portion of the potassium cations from the iron hexacyanide complex.

$$2K_3Fe(CN)_6 + 2H^+ \rightarrow 2HK_3Fe(CN)_6$$ (Reaction 3)

The "protonated" iron hexacyanide complex obtained from Reaction 3 can then undergo a further reaction in the second chamber of the electrochemical balancing cell as hydroxide ions from the bipolar membrane migrate into the second chamber and additional protons from the bipolar membrane migrate into the third chamber, as shown in FIG. 4 and discussed further above. Specifically, the hydroxide ions entering the second chamber react with the "protonated" iron hexacyanide complex to affect its neutralization according to Reaction 4 below.

$$HK_3Fe(CN)_6 + K^+ + OH^- \rightarrow K_4Fe(CN)_6 + H_2O$$ (Reaction 4)

The additional protons lower the pH of the negative electrolyte solution in the third chamber and promote cation transfer to the positive electrolyte solution in the first chamber, as discussed in detail above. Accordingly, the hydrogen peroxide allows neutralization of at least a portion of the hydroxide ions encountering the positive electrolyte solution to take place. Therefore, the pH of the positive electrolyte solution can be impacted to a lesser degree when hydrogen peroxide is present versus when it is not. Advantageously, the foregoing approach still allows the pH of the negative electrolyte solution in the third chamber to be lowered to offset the pH increase resulting from the initial parasitic reaction.

Although the foregoing approach is directed to the addition of hydrogen peroxide to the positive electrolyte solution, particularly an aqueous electrolyte solution containing an iron hexacyanide complex, it is to be recognized that similar principles can be used when it is desired to alter the pH of a positive electrolyte solution while only marginally impacting the pH of a negative electrolyte solution. In particular, in such alternative configurations, the negative electrolyte solution can be introduced to the first and second chambers of the electrochemical balancing cell, and the hydrogen peroxide can again be provided to the second chamber of the electrochemical balancing cell to affect a pH decrease in the positive electrolyte solution in the third chamber of the electrochemical balancing cell. In further alternative configurations, the hydrogen peroxide can be provided to the third chamber instead of the second chamber to affect related changes in pH, particularly if the polarity of the bipolar membrane is reversed.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" will refer to the total current passed in an electrochemical cell divided by the geometric area of the electrodes of the cell and is commonly reported in units of $mA/cm^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery system comprising:
 a first half-cell containing a first electrolyte solution; and
 a second half-cell containing a second electrolyte solution;
 wherein both the first half-cell and the second half-cell are in fluid communication with an electrochemical balancing cell comprising:
   a first chamber containing a first electrode:
   a second chamber containing a second electrode;
   a third chamber disposed between the first chamber and the second chamber:
   an ion-selective membrane forming a first interface between the first chamber and the third chamber: and
   a bipolar membrane forming a second interface between the second chamber and the third chamber;
 wherein at least one of the first electrolyte solution and the second electrolyte solution comprises an aqueous electrolyte solution.

2. The flow battery system of claim 1, wherein the ion-selective membrane comprises a cation-exchange material.

3. The flow battery system of claim 2, wherein the cation-exchange material comprises a sulfonated, perfluorinated polymer.

4. The flow battery system of claim 1, wherein the first electrolyte solution is a negative electrolyte solution, and the second electrolyte solution is a positive electrolyte solution.

5. The flow battery system of claim 4, wherein the first half-cell is in fluid communication with the first chamber and the second chamber, and the second half-cell is in fluid communication with the third chamber.

6. The flow battery system of claim 4, wherein the first half-cell is in fluid communication with the third chamber, and the second half-cell is in fluid communication with the first chamber and the second chamber.

7. The flow battery system of claim 1 wherein the first electrode is a negative electrode and the second electrode is a positive electrode.

8. The flow battery system of claim 1, wherein the first electrolyte solution and the second electrolyte solution each comprise an aqueous electrolyte solution.

9. The flow battery system of claim 1, wherein at least one of the first electrolyte solution and the second electrolyte solution comprises a coordination complex as an active material.

* * * * *

UNITED STATES PATENT AND TRADEMARK OFFICE
CERTIFICATE OF CORRECTION

PATENT NO. : 10,411,285 B2  
APPLICATION NO. : 15/098273  
DATED : September 10, 2019  
INVENTOR(S) : Reece et al.

Page 1 of 1

It is certified that error appears in the above-identified patent and that said Letters Patent is hereby corrected as shown below:

On the Title Page

Item [56], References Cited, under heading OTHER PUBLICATIONS, Replace:

"Annemiek Ter Heijne; "A Bipolar Membrane Combined with Ferric Iron Reduction as an Efficient Cathode System in Microbial Fuel Cells; Environ. Sci Technol, 2006, 40; XP007904193; 5200-5205" with --Heijne et al., "A Bipolar Membrane Combined with Ferric Iron Reduction as an Efficient Cathode System in Microbial Fuel Cells†; Environ. Sci Technol, 2006, 40; XP007904193; 5200-5205--

"Partial Supplementary European Search Report dated Feb. 9, 2017, which isued in European Application No. 14847451.3." with --Partial Supplementary European Search Report dated Feb. 9, 2017, which issued in European Application No. 14847451.3.--

In the Claims

Under Column no. 26, Claim no. 7, Line no. 19, Replace:

"The flow battery system of claim 1 wherein the first" with --The flow battery system of claim 1, wherein the first--

Signed and Sealed this  
Fourth Day of February, 2020

Andrei Iancu  
*Director of the United States Patent and Trademark Office*